E. R. KRESSE.
BELT SHIFTING DEVICE.
APPLICATION FILED AUG. 25, 1915.
1,222,216. Patented Apr. 10, 1917.
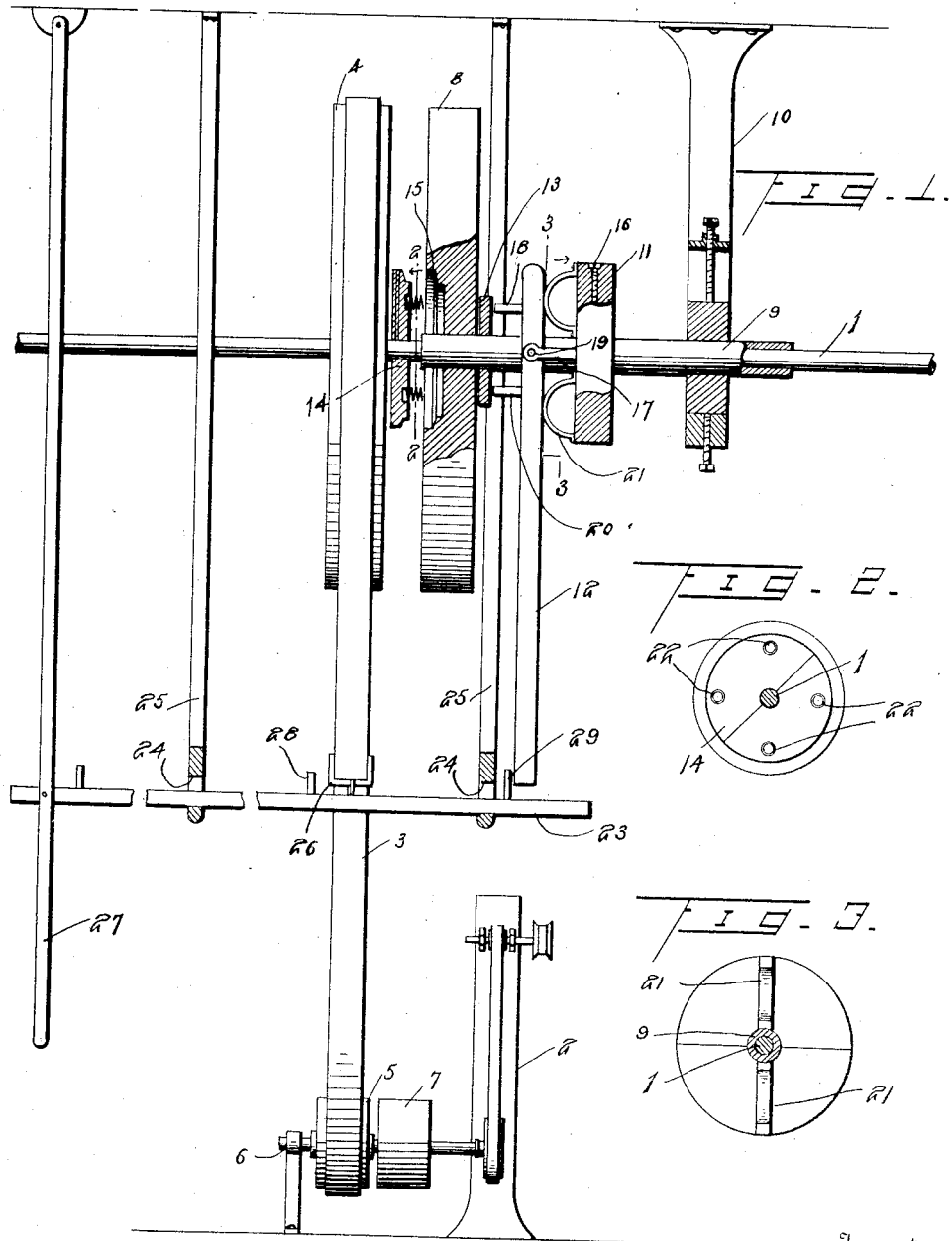
Witness
A. R. Stanton
W. T. Davidson
Inventor
E. R. Kresse.
By A. Randolph Jr.
Attorney

UNITED STATES PATENT OFFICE.

ERNEST ROBERT KRESSE, OF BROOKLYN, NEW YORK.

BELT-SHIFTING DEVICE.

1,222,216.  Specification of Letters Patent.  Patented Apr. 10, 1917.

Application filed August 25, 1915. Serial No. 47,372.

*To all whom it may concern:*

Be it known that I, ERNEST R. KRESSE, a subject of the Emperor of Germany, residing at Brooklyn, in the county of Kings and State of New York, have invented certain new and useful Improvements in Belt-Shifting Devices; and I do hereby declare the following to be a full, clear, and exact description of the invention, such as will enable others skilled in the art to which it appertains to make and use the same.

The invention relates to improvements in belt shifting devices.

The object of the present invention is to improve the construction of belt shifting devices and to provide a simple, practical and inexpensive belt shifting device equipped with means for enabling the belt for transmitting motion from the line shaft to the machine to be driven to be supported upon loose pulleys when the machine is not operated so that the belt will be relieved of wear and the noise and danger incident to belts of this character entirely eliminated and power saved.

A further object of this invention is to provide a belt shifting attachment of this character adapted to be readily applied to various line shafts and capable of easy operation for shifting a belt from the shaft to the loose pulleys.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing—

Figure 1 is an elevation partly in section of a belt shifting device constructed in accordance with this invention, Figs. 2 and 3 are detail views of the rotary and stationary collars of the device.

Like numerals of reference designate corresponding parts in the several figures of the drawing.

In the accompanying drawing in which is illustrated the preferred embodiment of the invention, 1 designates a live line shaft which continuously rotates and from which motion is transmitted to a machine 2 by a belt 3 and fast pulleys 4 and 5 fixed to the shaft 1 and to the shaft 6 of the machine 2. The shaft 6 of the machine is also provided with a loose pulley 7 on which the belt 3 is shifted when it is desired to stop the machine. To prevent the belt 3 from continuously rotating while it is on the loose pulley 7 a loose pulley 8 is provided and is arranged in alinement with the said pulley 7. The loose pulley 8 is mounted upon a fixed sleeve 9 of considerably greater diameter than the live shaft 1 to provide intervening space between the interior of the sleeve and the line shaft so that the line shaft may rotate freely without contact with the supporting sleeve 9. The sleeve 9 is mounted in an opening of a supporting hanger 10 and it carries a collar or disk 11 constituting a supporting member and having fulcrumed to it a lever 12 which is adapted to actuate a sliding collar 13 for forcing the loose pulley 8 outward into frictional engagement with a rotating collar or member 14 fixed to the line shaft 1 and located adjacent to the left hand end of the supporting sleeve 9. The loose pulley 8 which is of the same diameter as the fast pulley 4 of the line shaft 1 is located at the left hand end of the sleeve 9 and it is provided in its outer face with a recess 15 arranged at the center of the pulley 8 and adapted to permit the latter to fit over the fixed rotating collar 14 of the line shaft whereby the pulley 8 will be brought into substantially flush relation with the fast pulley 4 and will be rotated by the collar 14 to facilitate the shifting of the belt 3 from the fast pulley 4 to the loose pulley 8 and from the loose pulley 8 to the fast pulley 4.

The disk or supporting member 11 which is secured to the sleeve by a set screw 16 is provided with an arm 17 having a terminal eye 18 for the reception of a pivot 19 which forms the fulcrum for the lever 12. The pivot 19 is located adjacent to one end of the lever 12 which has a limited movement sufficient to carry projecting screws or studs 20 into engagement with the sliding collar 13 for actuating the latter to force the loose pulley 8 outwardly over the rotating collar 14. The studs or projections 20 formed by the screws are located at opposite sides of the pivot or fulcrum of the lever 12 and when the latter is oscillated, one or the other of the said studs or projections is adapted to engage the slidable collar 13 and move the same outwardly. The supporting member or collar 11 is equipped with bowed springs 21 each secured at one end to the collar or supporting member 11 and having its other end free and adapted to slide over the face of the same. The springs 21 are located at opposite sides of the pivot of the lever 12 and are adapted to normally maintain the lever 12 in a central vertical or neutral position. The rotating collar is provided at its face opposite the loose pulley 8 with a plurality of coiled springs 22 which are compressed when the loose pulley 8 is moved outwardly over the rotating collar and which are adapted to force the loose pulley 8 backwardly on the supporting sleeve 9 and out of engagement with the rotating collar after the shifting of the belt has been effected. In practice the loose pulley 8 will be rotated 7 or 8 revolutions which will be ample to obtain the desired result. In practice, the sleeve 9, the collar or supporting member 11, the sliding collar 13, the loose pulley 8 and the rotating collar 14 will all be constructed in sections to enable them to be placed around the line shaft and readily assembled in position and the supporting hanger 10 may be of any desired construction as will be readily understood.

The lever 12 is actuated by a slidable bar or member 23 guided in openings 24 of depending supporting bars 25 and carrying a belt fork 26 which straddles the belt 3 and is adapted to move the same laterally. The slidable bar or member 23 is connected at the left hand end with an operating or shifting lever 27 and it is equipped with projections or studs 28 and 29. The projections or studs 28 preferably consist of screws and are adapted to be located at suitable distances at each side of the outer supporting bar or member 25 for limiting the movement of the slidable bar or member 23 and at the same time permit sufficient movement to shift the belt 3 from one position to the other. The other projecting stud 29 is arranged to engage the lever 12 and it is adapted to move the same to the right or to the left according to the direction in which the slidable bar or member 23 is moved and after actuating the lever 12 it passes the same and occupies a position at the opposite side thereof so as to move the lever 12 in the opposite direction on the return movement of the slidable bar or member 23 and also to release the said lever 12 and permit the same to be moved to a neutral position by the spring 21 automatically after the belt has been shifted from one position to the other so that the loose pulley 8 will be maintained in a neutral position normally.

It will be seen that the device is exceedingly simple and inexpensive in construction and that it is adapted to be readily applied to shafting and that it is capable of relieving a belt of considerable wear and at the same time of enabling a belt to remain stationary and noiseless when a machine is not in operation. Also it will be clear that by permitting the belt to remain stationary when the machine is not in use that all danger from moving belts will be eliminated except when a machine is in actual operation and save considerable power.

What is claimed is:—

1. In a belt shifting device of the character described the combination with a continuously rotating line shaft having a fast pulley, mounted thereon, and a belt on said pulley, of a fixed supporting sleeve surrounding the line shaft, a loose pulley slidably mounted on the sleeve, means for shifting the belt from the fast pulley to the loose pulley and vice versa and for simultaneously moving the loose pulley toward the fast pulley, and a fixed or fast rotating sleeve mounted on the line shaft and arranged to engage and partially rotate the loose pulley and provided with means for yieldably urging the loose pulley backwardly whereby the same is automatically returned to its normal position.

2. In a belt shifting device of the class described, the combination with a continuously rotating line shaft having a fast pulley mounted thereon, and a belt on said pulley, of a stationary sleeve surrounding the line shaft, a loose pulley mounted on the sleeve and movable toward and from the fast pulley and adapted to receive the belt therefrom, means for shifting the belt from the fast pulley to the loose and from the loose pulley to the fast pulley and for simultaneously moving the loose pulley toward the fast pulley and a collar or member fixed to the line shaft and arranged to engage and partially rotate the loose pulley and provided also with springs for automatically moving the loose pulley backwardly to its normal position on the stationary sleeve.

3. In a belt shifting device of the class described, the combination with a continuously rotating line shaft having a fast pulley mounted thereon, and a belt on said pulley, of a stationary supporting member extending longitudinally of the line shaft, a loose pulley slidably mounted on the supporting member, said loose pulley being of substantially the same diameter as the fast pulley, means for shifting the belt from the fast pulley to the loose pulley and from the loose pulley to the fast pulley, a lever provided with means for moving the loose pulley toward the fast pulley, a supporting collar mounted on the said supporting member and having the lever fulcrumed on it, said supporting collar being provided at opposite sides of the fulcrum point of the lever with springs for automatically returning the lever to a neutral position.

4. In a belt shifting device of the class described, the combination with a continuously rotating line shaft having a fast pulley mounted thereon, and a belt on said pulley, of a stationary supporting member extending along the line shaft, a loose pulley mounted on the said member, and movable toward and from the fast pulley, belt shifting means for moving the belt to and from the fast pulley, a lever provided with means for moving the loose pulley toward the fast pulley simultaneously with the operation of the belt shifting means, the latter being provided with means for actuating the said lever and for releasing the same and means for automatically returning the lever to a neutral position.

5. In a belt shifting device of the class described, the combination with a continuously rotating line shaft having a fast pulley mounted thereon, and a belt on said pulley, of a supporting sleeve mounted in a stationary position around the line shaft, a loose pulley slidable on the sleeve toward and from the fast pulley, a fast rotating collar mounted on the said shaft in the path of the loose pulley and adapted to partially rotate the same, a slidable collar mounted on the sleeve, a lever arranged to actuate the sliding collar for moving the loose pulley toward the fast pulley and belt shifting means for moving the belt toward and from the fast pulley and for simultaneously actuating the said lever.

6. In a belt shifting device of the class described, the combination with a continuously rotating line shaft, and a fast pulley mounted thereon, of a stationary sleeve surrounding the line shaft, a loose pulley slidable on the said sleeve and provided with a central recess, a rotating collar fixed to the line shaft and arranged to engage the loose pulley in the recess thereof for partially rotating the said loose pulley, a lever provided with means for moving the loose pulley toward the fast pulley, a slidable bar or member provided with means for engaging and actuating the said lever and an operating lever connected with the slidable bar or member.

7. In a belt shifting device of the class described, the combination with a continuously rotating line shaft, and a fast pulley mounted thereon, of a stationary sleeve surrounding the line shaft, a loose pulley slidable on the said sleeve and provided with a central recess, a rotating collar fixed to the line shaft and arranged to engage the loose pulley in the recess thereof for partially rotating the said loose pulley, a lever provided with means for moving the loose pulley toward the fast pulley, a slidable bar or member provided with a belt fork and having a stud arranged to engage the said lever and release the same, springs for automatically returning the lever to a neutral position and operating means connected with the slidable bar or member.

8. In a belt shifting device of the class described, the combination with a continuously rotating line shaft, and a fast pulley mounted thereon, of a stationary sleeve surrounding the line shaft, a loose pulley slidable on the said sleeve and provided with a central recess, a rotating collar fixed to the line shaft and arranged to engage the loose pulley in the recess thereof for partially rotating the said loose pulley, a lever provided with means for moving the loose pulley toward the fast pulley, supporting rods or bars provided with guide openings, a slidable bar or member operating in the guide openings and provided with a belt fork and having a stud arranged to engage and actuate the lever and pass the same to release the said lever to permit the latter to return to a neutral position and an operating lever connected with the slidable bar or member.

9. In a belt shifting device of the class described, the combination with a continuously rotating line shaft, and a fast pulley mounted thereon, of a stationary sleeve surrounding the line shaft, a loose pulley slidable on the said sleeve and provided with a central recess, a rotating collar fixed to the line shaft and arranged to engage the loose pulley in the recess thereof for partially rotating the said loose pulley, a lever provided with means for moving the loose pulley toward the fast pulley, supporting rods or bars provided with guide openings, a slidable bar or member operating in the guide openings and provided with a belt fork and having a stud arranged to engage and actuate the lever and pass the same to release the said lever to permit the latter to return to a neutral position, spaced stop lugs carried by the slidable bar or member and arranged to limit the movement of the bar or member in the said opening, and operating means connected with the bar or member for sliding the same.

In testimony whereof I affix my signature in presence of two witnesses.

ERNEST ROBERT KRESSE.

Witnesses:
ELMER H. WOOD,
HUGO BOETTGER.